US007020579B1

(12) United States Patent
Miseli et al.

(10) Patent No.: US 7,020,579 B1
(45) Date of Patent: Mar. 28, 2006

(54) METHOD AND APPARATUS FOR DETECTING MOTION-INDUCED ARTIFACTS IN VIDEO DISPLAYS

(75) Inventors: Joseph V. Miseli, San Bruno, CA (US); Eric Boucher, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 161 days.

(21) Appl. No.: 10/713,846

(22) Filed: Nov. 14, 2003

Related U.S. Application Data

(60) Provisional application No. 60/504,116, filed on Sep. 18, 2003, provisional application No. 60/514,870, filed on Oct. 27, 2003.

(51) Int. Cl.
*G06F 11/30* (2006.01)
*G06F 15/00* (2006.01)
*G21C 17/00* (2006.01)

(52) U.S. Cl. .................................................... 702/182

(58) Field of Classification Search ................ 702/182; 345/10; 348/169, 443, 208, 699, 333.12; 375/240.1; 482/100; 382/239
See application file for complete search history.

(56) References Cited

U.S. PATENT DOCUMENTS 5,347,312 A * 9/1994 Saunders et al. ........... 348/443
6,366,705 B1 * 4/2002 Chiu et al. .................. 382/239
6,501,503 B1 * 12/2002 Kudo .................... 348/208.99
6,778,210 B1 * 8/2004 Sugahara et al. ........ 348/208.4
2003/0011717 A1 * 1/2003 McConica .................. 348/699
2003/0012565 A1 * 1/2003 Otani et al. ................... 396/52
2003/0179308 A1 * 9/2003 Zamorano et al. ..... 348/333.12
2004/0001544 A1 * 1/2004 Mehrotra ................. 375/240.1
2004/0100421 A1 * 5/2004 Webb et al. .................. 345/10
2004/0127337 A1 * 7/2004 Nashner ..................... 482/100
2004/0239763 A1 * 12/2004 Notea et al. ................ 348/169

OTHER PUBLICATIONS

Publication entitled "Motion Octire Res PMSE Time Measurement Proposed Standard," Video Electronics Standards Association, 920 Hillview Court, Suite 140, Milpitas, CA 95035.

* cited by examiner

*Primary Examiner*—Michael Nghiem
*Assistant Examiner*—Aditya Bhat
(74) *Attorney, Agent, or Firm*—Park, Vaughan & Fleming LLP

(57) ABSTRACT

One embodiment of the present invention provides a system that tests the motion performance of an electronic display system, wherein the electronic display system includes a display, graphics processing software, graphics processing circuitry, and an interface coupling the display and the graphics processing circuitry. The system starts by receiving a request to measure an amount of distortion of an object in motion. In response to the request, the system measures the amount of distortion of the object in motion. In a variation on this embodiment, measuring the amount of distortion of the object in motion involves placing a ruler on a boundary of the object where the distortion occurs, increasing the width of the ruler until it covers the distortion, and then measuring the width to determine the size of the distortion.

27 Claims, 6 Drawing Sheets

METHOD AND APPARATUS FOR DETECTING MOTION-INDUCED ARTIFACTS IN VIDEO DISPLAYS

RELATED APPLICATION

This application hereby claims priority under 35 U.S.C. §119 to U.S. Provisional Patent Application No. 60/504,116 filed on 18 Sep. 2003, entitled "Motion Artifact Detection and Analysis Tool," by inventors Eric Boucher and Joseph V. Miseli, and to U.S. Provisional Patent Application No. 60/514,870 filed on 27 Oct. 2003, entitled "Motion Artifact Detection and Analysis Tool," by inventors Eric Boucher and Joseph V. Miseli.

BACKGROUND

1. Field of the Invention

The present invention relates to video displays. More specifically, the present invention relates to a method and an apparatus for detecting motion-induced artifacts on electronic display systems.

2. Related Art

Liquid Crystal Displays (LCDs) have considerably more difficulty than traditional Cathode Ray Tube (CRT) displays in accurately reproducing moving video images. In recent years, LCDs have advanced beyond CRTs in size and resolution, and are becoming comparable to CRTs in visual performance. During this time, visual performance issues, in which the LCDs lag the CRTs, have been addressed and have been improved significantly. However, until recently, the motion performance of LCDs has been considered, but only basic performance with regard to pixel response time and simple motion artifacts has been addressed.

In determining the performance of LCD displays, many manufacturers qualify the product to assure that motion on the displays is within good engineering bounds. They may do simple image movement testing or response time testing to quantify it. To date, their assessment techniques and options are quite limited.

Until other performance issues were addressed, motion performance issues for LCDs have generally been on the back burner. Now that these other performance issues have been controlled, it is time to deal with motion performance issues in LCDs.

Hence, what is needed is a method and an apparatus for testing motion performance in LCDs and other electronic display systems without the limitations listed above.

SUMMARY

One embodiment of the present invention provides a system that tests the motion performance of an electronic display system, wherein the electronic display system is comprised of a display, graphics processing software, graphics processing circuitry, and an interface coupling the display and the graphics processing circuitry. The system starts by receiving a request to measure an amount of distortion of an object in motion. In response to the request, the system measures the amount of distortion of the object in motion.

In a variation on this embodiment, the system displays a second object and measures the distortion that occurs when the two objects interact.

In a variation on this embodiment, the system receives a request to change a visual attribute of the object. In response to this request, the system changes the visual attribute of the object.

In a further variation, the visual attribute can include color, size, shape, shading, fill pattern, speed, direction of movement, and type of movement.

In a variation on this embodiment, measuring the amount of distortion of the object in motion involves placing a ruler on a boundary of the object where the distortion occurs, increasing the width of the ruler until it covers the distortion, and then measuring the width to determine the size of the distortion.

In a further variation, the ruler is displayed every $n^{th}$ display cycle to minimize distortion of the ruler.

In a further variation, the width of the ruler is used to determine the response time of pixels in the display for any color or gray scale level.

In a variation on this embodiment, the distortion can include flickering, flashing, smearing, bluring, line spreading, geometric distortion, color-induced artifacts, and inaccurate color reproduction.

In a variation on this embodiment, the system stores the set of test parameters to a storage medium to facilitate producing an identical set of test parameters during a subsequent test.

In a variation on this embodiment, the system records the measured distortion on a storage medium. Note that this facilitates in creating a benchmark and a report for a display system under test and provides information for characterizing the display performance over multiple test conditions.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system.

This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Display-Testing for Motion Artifacts

Figure 1:
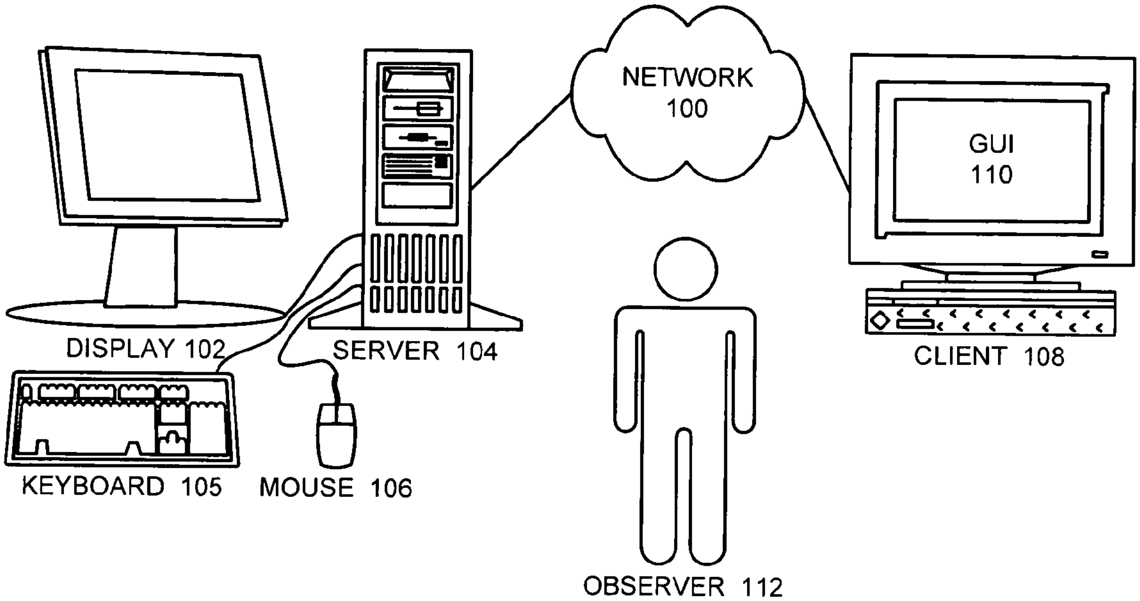
FIG. 1 illustrates a system that tests displays for motion artifacts in accordance with an embodiment of the present invention.

FIG. 1 illustrates a system for testing displays for motion artifacts in accordance with an embodiment of the present invention. The system illustrated in FIG. 1 comprises server 104 and client 108 which are coupled to network 100. Note that server 104 can generally include any computational node including a mechanism for servicing requests from a client for computational and/or data storage resources. Also, note that client 108 can generally include any node on a network including computational capability and including a mechanism for communicating across the network. Network 100 can generally include any type of wire or wireless communication channel capable of coupling together computing nodes. This includes, but is not limited to, a local area network, a wide area network, or a combination of networks. In one embodiment of the present invention, network 100 includes the Internet.

Display 102 is the display that is being tested for motion artifacts. Note that the motion artifacts can be caused by any part of the display system, including graphics processing circuitry, the interface coupling the graphics processing circuitry to the display, and the display itself. Display 102 is coupled to server 104. Also coupled to server 104 is keyboard 105 and mouse 106. During the testing process, observer 112 may use GUI 110 on client 108 to manipulate objects on display 102 to test for motion induced artifacts. Additionally, observer 112 may use keyboard 105 and/or mouse 106 to manipulate objects on display 102.

Display-Testing Software

Figure 2:
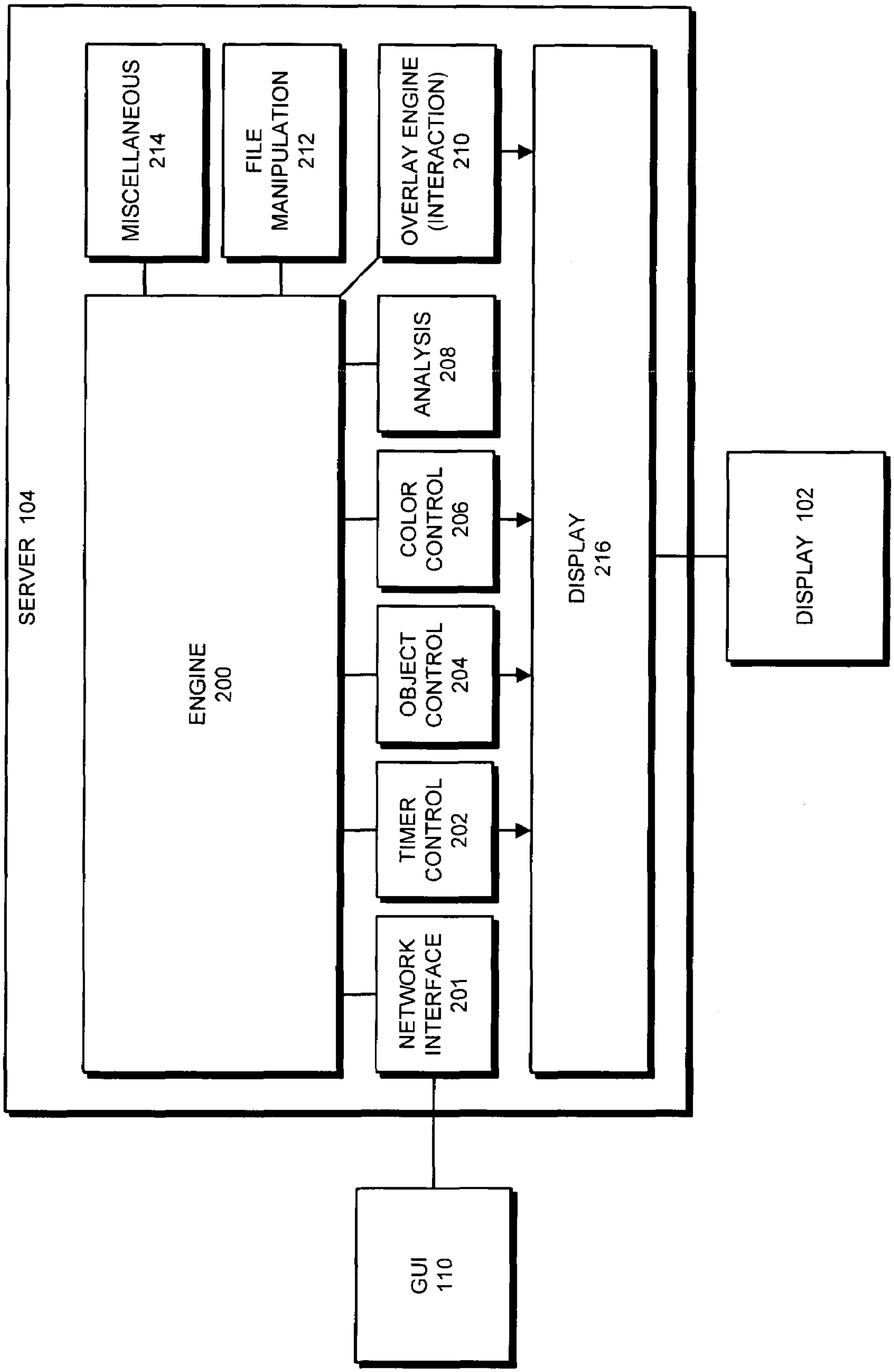
FIG. 2 illustrates the structure of display-testing software in accordance with an embodiment of the present invention.

FIG. 2 illustrates the structure of display-testing software in accordance with an embodiment of the present invention. In one embodiment of the present invention, this software is known as the Motion Artifact Detection and Analysis Tool (MADAT). In this embodiment, MADAT is installed on server 104, and is comprised of engine 200, as well as various support modules. These modules can include, network interface module 201, timer control module 202, object control module 204, color control module 206, analysis module 208, overlay engine module 210, file manipulation module 212, miscellaneous module 214, and display module 216.

Network interface module 201 allows engine 200 to communicate with GUI 110. Note that GUI 110 can exist on any machine coupled to network 100, or even on server 104 itself.

Overlay engine module 210 allows two objects to be controlled simultaneously in order to test the interaction of two moving objects. Overlay engine module 210 is comprised of an almost identical set of components as the MADAT software itself. For instance, within overlay engine module 210, you will find a timer control, an object control, and a color control.

Display module 216 takes input from timer control module 202, object control module 204, color control module 206 and overlay engine module 210, and uses these inputs to determine a set of graphical images to output to display 102, which is the display under test.

GUI—Geometry Configuration

Figure 3:
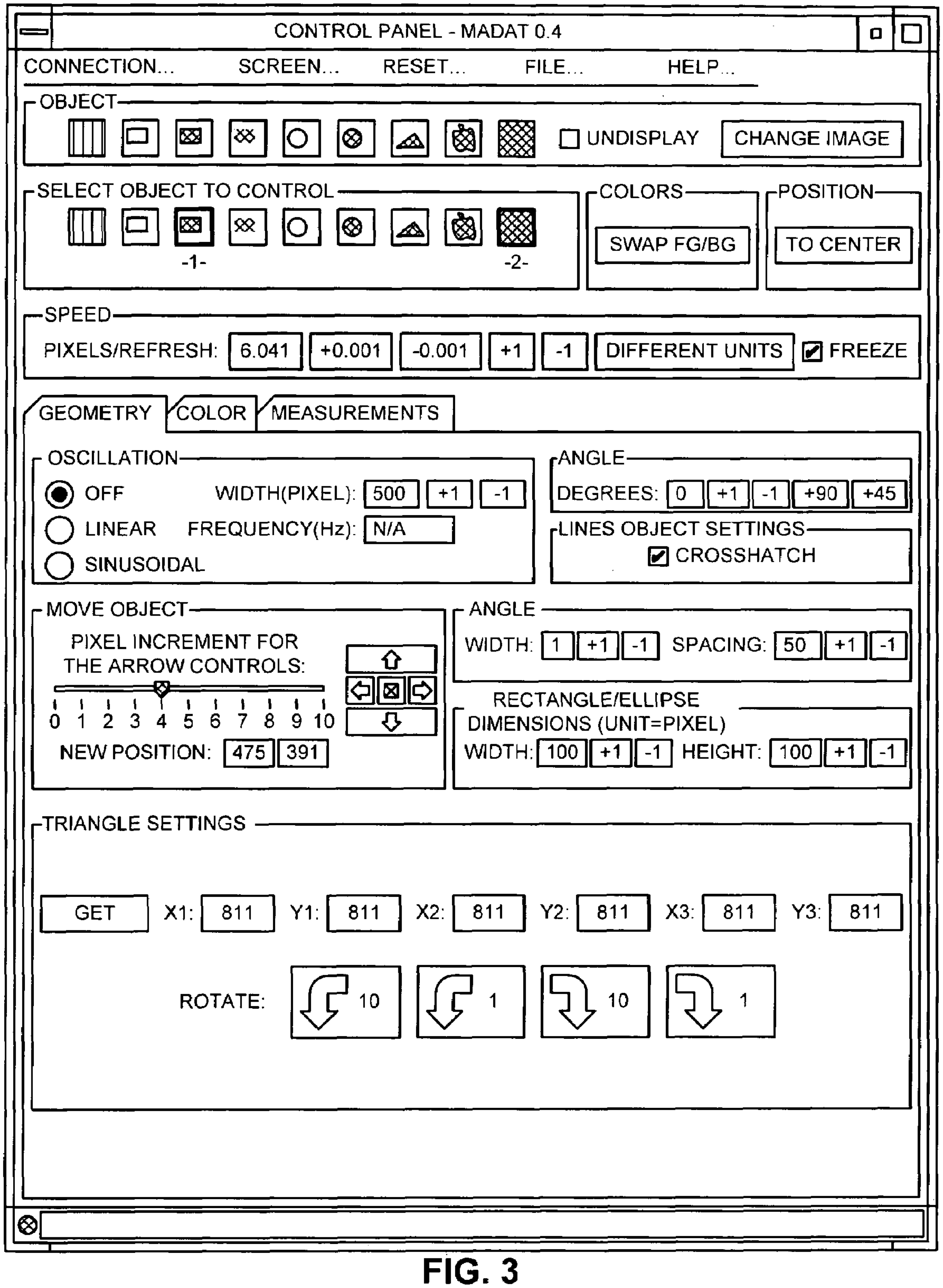
FIG. 3 illustrates the geometry configuration portion of the display-testing GUI in accordance with an embodiment of the present invention.

FIG. 3 illustrates the geometry configuration portion of GUI 110 in accordance with an embodiment of the present invention. GUI 110 allows observer 112 to set various attributes related to the geometry of the object being used to test display 102. These attributes can include oscillation, angle, line attributes, location, dimensions, and shape. Note that in addition to GUI 110, observer 112 may use the command-line interface with keyboard 105 to implement all of the functionality accessible via GUI 110. The command-line interface offers additional speed, compactness, and flexibility.

GUI 110 allows observer 112 to take control of virtually every aspect of the visual environment of display 102. Observer 112 may select from a set of pre-define objects, as well as importing a custom object. In addition, observer 112 may select two objects to additionally test for artifacts caused by the interaction of the two objects.

In one embodiment of the present invention, observer 112 may set the motion type of the object to linear, linear oscillation, or sinusoidal oscillation. During sinusoidal oscillation, the object moves the fastest through the center of oscillation, and the slowest at the end points. In the instances where oscillation is chosen, observer 112 can choose the width and the frequency of oscillation.

Additionally, observer 112 can change the direction of motion as well as the speed. In one embodiment of the present invention, speed is referred to as pixels per refresh, or simply the number of pixels the object moves on the display for each refresh cycle of the display. Since the display size and refresh rate is known to the program, speed can also be expressed in various other terms, such as inches per second.

In one embodiment of the present invention, observer 112 may use GUI 110, as well as clicking and dragging portions of the object itself to alter the object's geometry.

GUI—Color Configuration

Figure 4:
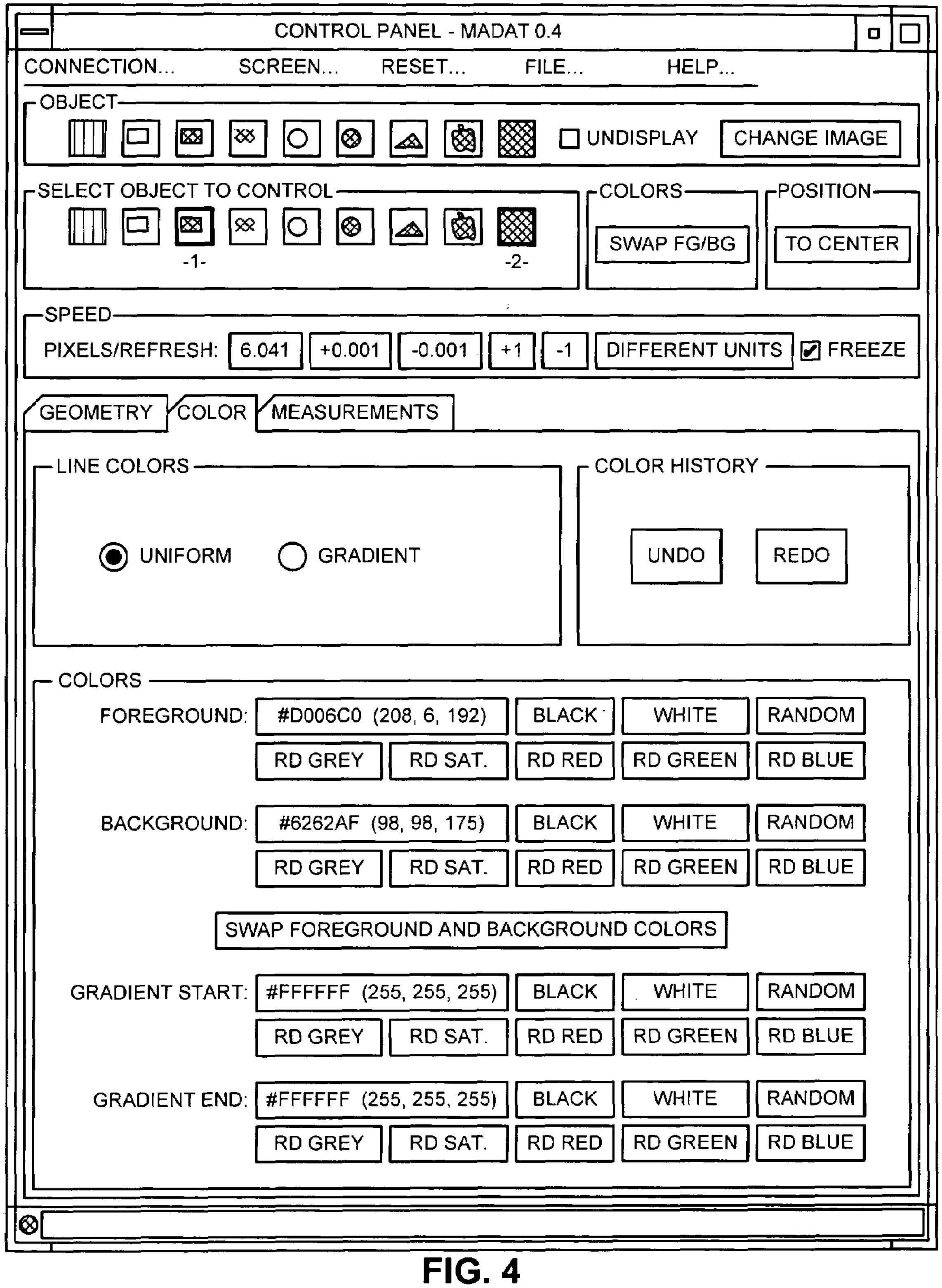
FIG. 4 illustrates the color configuration portion of the display-testing GUI in accordance with an embodiment of the present invention.

FIG. 4 illustrates the color configuration portion of GUI 110 in accordance with an embodiment of the present invention. GUI 110 allows observer 112 to set various attributes related to the color of the object being used to test display 102. These attributes can include line colors, foreground colors, background colors, and gradient shading.

Note that it is important to consider color when testing a display for motion-produced artifacts. Since pixels on a display may exhibit different response times to turn on or off for different colors, distortions may not be noticeable for one set of colors, but may be extremely noticeable with another set of colors.

GUI—Measurement Configuration

Figure 5:
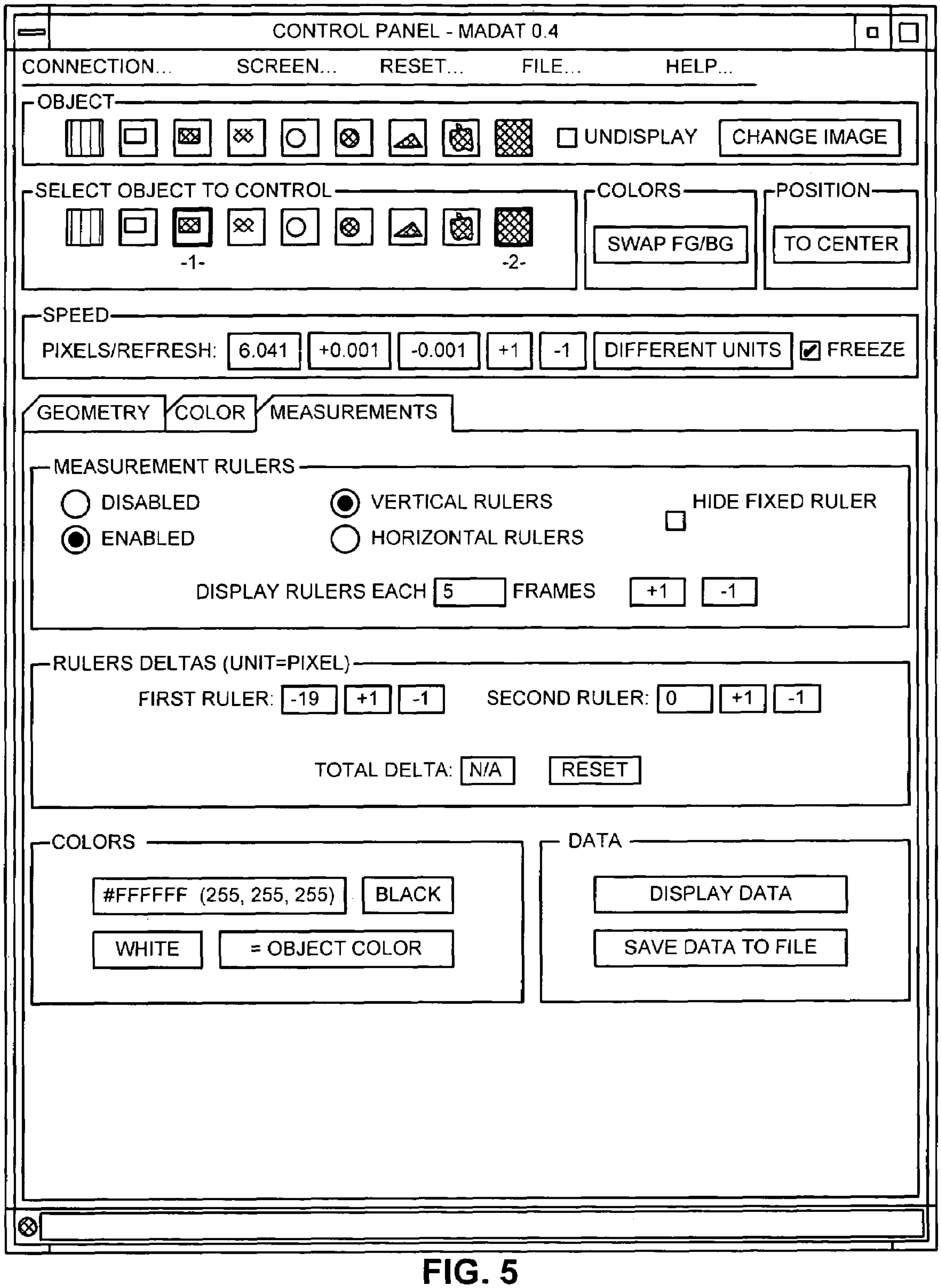
FIG. 5 illustrates the measurements configuration portion of the display-testing GUI in accordance with an embodiment of the present invention.

FIG. 5 illustrates the measurements configuration portion of GUI 110 in accordance with an embodiment of the present invention. GUI 110 allows observer 112 to set various attributes related to the measuring of the artifacts produced on display 102. These attributes can include the types of measurement rulers, the colors of the rulers, and the deltas of the rulers.

When observer 112 notices an artifact or distortion, observer 112 may choose to measure the distortion by displaying rulers along with the object that is being distorted. In one embodiment of the present invention, one ruler is placed along the leading edge of the moving object, and another ruler is placed on the trailing edge. The rules may be widened, represented by the delta value, to cover the area of the distortion. Once the ruler covers the distortion completely, the delta value indicates the amount of distortion caused by the moving object with a specific set of visual attributes. The delta value can then be used to compute the response times for the pixels under the given visual attributes. Note that the ruler on the leading edge measures the response time for the pixels to turn on, while the trailing edge ruler measures the response time for the pixels to turn off. Note that rulers can be any shape or size including, but not limited to, lines, shapes, background images, and multiple lines. Also note that the rulers may be oriented in any direction and attached to any portion of the artifact.

In one embodiment of the present invention, the rulers may be displayed at every n refresh cycles of display 102. This allows for greater accuracy in measuring the distortion by minimizing motion artifacts caused by the rulers moving.

Testing Displays for Motion Artifacts

Figure 6:
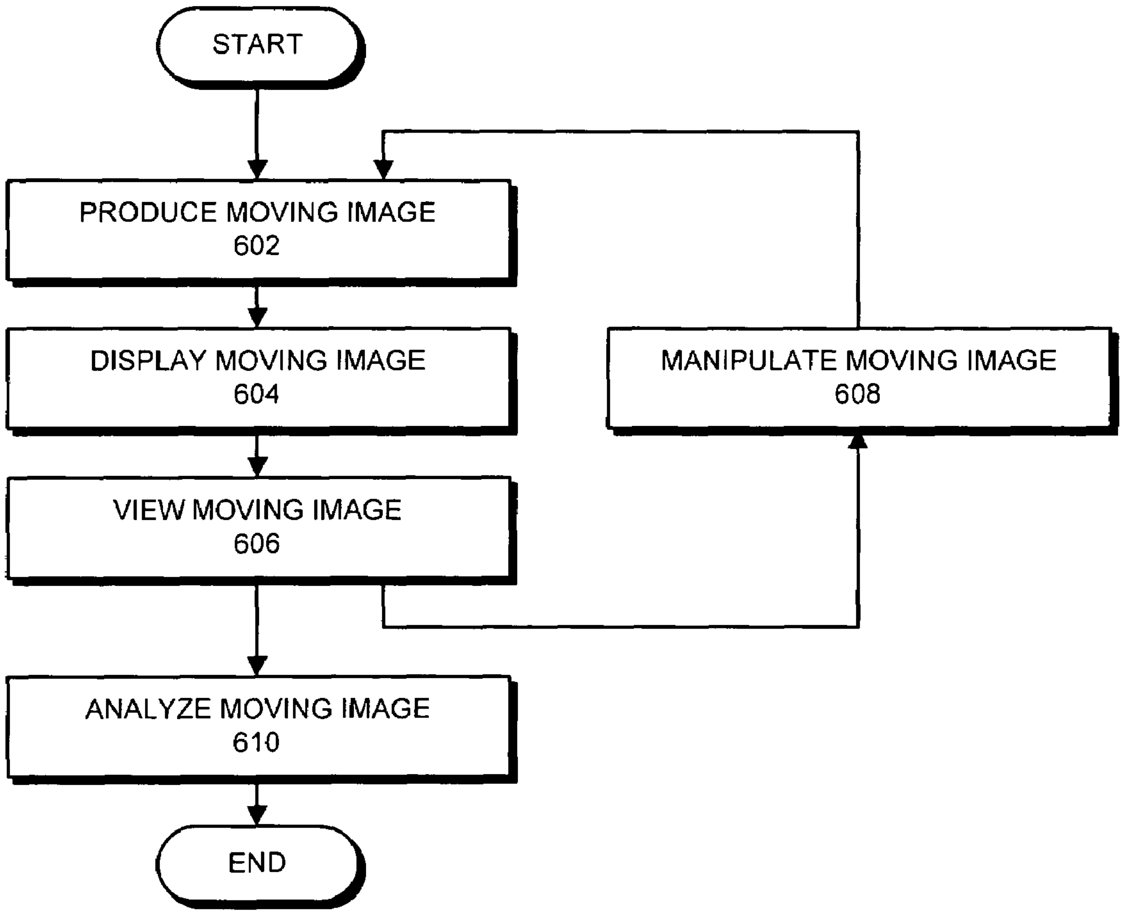
FIG. 6 presents a flow chart illustrating the process of testing a display for motion artifacts in accordance with an embodiment of the present invention.

FIG. 6 presents a flow chart illustrating the process of testing a display for motion artifacts in accordance with an embodiment of the present invention. A video image is generated which shows an object moving across display 102 in time. An ideal display will produce the object precisely, with no temporal degradation. Display 102 may have latency, response time limitations, real time processing (timing) difficulties, real-time color rendering delays, and a host of other temporal processing inaccuracies which may contribute to reproducing the content with distortions, or artifacts. The moving object may be visible on display 102 producing artifacts of various types, including flickering, flashing, smearing, distorting, producing inaccurate colors, etc. These are all undesired temporal distortions. Ideally, the object should look exactly the same to observer 112 while the object is in motion and while the object is still. In addition, the object should look the same over time and be free from temporal distortions that are not motion-induced.

The distortion in such a case can be easily observed. However, the characteristics of the human visual system can contribute to some perceptions of distortion that may not actually be generated on display 102. It is a major part of this program to provide enough tools and control to help definitively assess the motion distortion using other than the eye of observer 112.

The system starts by producing an image (step 602) and displaying the image on display 102 (step 604). Note that the image can include a pre-defined image such as a line, a hollow box, a filled box, a hollow ellipse, a filled ellipse, a hollow triangle, a filled triangle, random line patterns, or a custom image that observer 112 imports. Note that different images can produce different types of motion-induced artifacts. Observer 112 views the image (step 606) and manipulates the controls that produce the image via GUI 110, and or keyboard 105 and mouse 106, (step 608). As the image controls are manipulated, the system repeats steps 602 through 608. Upon discovering a noticeable artifact, the system may analyze the image (step 610), or provide adequate control for subjective determination of the artifact by observer 112.

Note that the motion artifacts can be caused by any part or on any part of the display system. For example, in one embodiment of the present invention, artifacts may be observed that are the result of poor response time for pixels within an LCD display. Artifacts may also result from a flaw in the graphics processing circuitry or the software that generates the images for the display. Furthermore, artifacts may be observed that are the result of characteristics on the transmission lines between the graphics processor and the display such as cross-talk, amplitude dependencies, and skew.

Measuring a Motion-Induced Artifact

Figure 7:
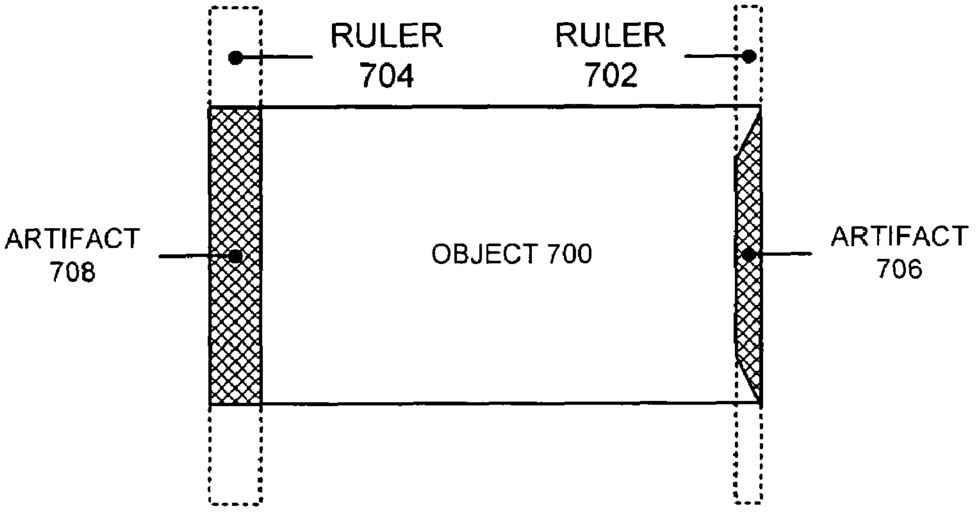
FIG. 7 illustrates measuring a motion-induced artifact in accordance with an embodiment of the present invention.

FIG. 7 illustrates measuring a motion-induced artifact in accordance with an embodiment of the present invention. Analysis of the image is a combination of the subjective, which requires the input of observer 112, and numerical analysis which is done by the system itself. Due to the dynamic nature of the system, observer 112 is able to constantly manipulate the attributes of the display system to detect and quantify any number of visual artifacts. In some instances, artifacts might be easily detectable but difficult to quantify, such as flickering of the object. In these cases, the system facilitates in producing artifacts so that subjective analysis and reporting can begin.

One type of numerical analysis is performed by creating guides or rules along portions of the object being displayed. In one embodiment, one ruler (ruler 702) is created on the leading edge of moving object 700, and another ruler (ruler 704) is created on the trailing edge. By altering a delta value for each ruler, the width of the rulers can be changed to completely cover the area of distortion on each of the edges of the object. For instance, the delta value can be changed for ruler 702 until it completely covers artifact 706, and the delta value for ruler 704 can be changed until it completely covers artifact 708. Theoretically, the delta should remain at zero, even while object 700 is in motion. However, as motion is introduced and the various attributes of object 700 are modified, it is possible to measure the differences as the distortion occurs. This aids in quantifying the distortion in addition to describing the distortion.

The delta of leading edge ruler 702 can be used to quantify the response time for the pixels to turn on for the given set of visual attributes. Likewise, the delta of trailing edge ruler 704 can be used to quantify the response time for the pixels to turn off for the given set of visual attributes. Note that it may be important for the rulers 702 and 704 to be displayed every $n^{th}$ refresh cycle so that distortion of the rulers in motion does not come into play.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

The invention claimed is:

1. A method for testing the motion performance of an electronic display system, wherein the electronic display system is comprised of a display, graphics processing software, graphics processing circuitry, and an interface coupling the display and the graphics processor, the method comprising:

receiving a set of test parameters;

using the set of test parameters to generate a video image of an object in motion;

displaying the video image of the object in motion on the display; and measuring the amount of distortion in the shape of the object in motion relative to the shape of the object in a stationary state, wherein measuring the amount of distortion of the object in motion relative to the object in the stationary state further involves:

placing a ruler on a boundary of the object where the distortion occurs, increasing a width of the ruler until the ruler covers the distortion and measuring the width of the ruler to determine the size of the distortion.

2. The method of claim 1, wherein the method further comprises;

displaying a second object; and measuring the amount of distortion caused by the interaction of the second object with the object in motion.

3. The method of claim 1, further comprising:

receiving a request to change an attribute of the object in motion; and in response to the request, changing an attribute of the object in motion.

4. The method of claim 3, wherein the attributes can include one of color, size, shape, shading, fill pattern, speed, direction of movement, and type of movement.

5. The method of claim 1, further comprising displaying the ruler every $n^{th}$ refresh cycle to minimize distortion of the ruler.

6. The method of claim 1, further comprising using the width of the ruler to determine response time of the pixels in the display.

7. The method of claim 1, wherein the distortion can include one of:

flickering;

flashing;

smearing;

bluring;

line spreading;

geometric distortion;

color-induced artifacts; and inaccurate color reproduction.

8. The method of claim 1, further comprising storing the set of test parameters to a storage medium to facilitate producing an identical set of test parameters during a subsequent test.

9. The method of claim 1, further comprising recording the measured distortion on a storage medium.

10. A computer-readable storage medium storing instructions that when executed by a computer cause the computer to perform a method for testing the motion performance of an electronic display system, wherein the electronic display system is comprised of a display, graphics processing software, graphics processing circuitry, and an interface coupling the display and the graphics processing circuitry, the method comprising:

receiving a set of test parameters;

using the set of test parameters to generate a video image of an object in motion;

displaying the video image of the object in motion on the display; and measuring the amount of distortion in the shape of the object in motion relative to the shape of the object in a stationary state, wherein measuring the amount of distortion of the object in motion relative to the object in the stationary state further involves:

placing a ruler on a boundary of the object where the distortion occurs, increasing a width of the ruler until the ruler covers the distortion, and measuring the width of the ruler to determine the size of the distortion.

11. The computer-readable storage medium of claim 10, wherein the method further comprises:

displaying a second object; and measuring the amount of distortion caused by the interaction of the second object with the object in motion.

12. The computer-readable storage medium of claim 10, wherein the method further comprises:

receiving a request to change an attribute of the object in motion; and in response to the request, changing an attribute of the object in motion.

13. The computer-readable storage medium of claim 12, wherein the attributes can include one of color, size, shape, shading, fill pattern, speed, direction of movement, and type of movement.

14. The computer-readable storage medium of claim 10, wherein the method further comprises displaying the ruler every $n^{th}$ refresh cycle to minimize distortion of the ruler.

15. The computer-readable storage medium of claim 10, wherein the method further comprises using the width of the ruler to determine response time of the pixels in the display.

16. The computer-readable storage medium of claim 10, wherein the distortion can include one of:

flickering;

flashing;

smearing;

bluring;

line spreading;

geometric distorting;

color-induced artifacts; and inaccurate color reproduction.

17. The computer-readable storage medium of claim 10, wherein the method further comprises storing the set of test parameters to a storage medium to facilitate producing an identical set of test parameters during a subsequent test.

18. The computer-readable storage medium of claim 10, wherein the method further comprises recording the measured distortion on a storage medium.

19. An apparatus for testing the motion performance of an electronic display system, wherein the electronic display system is comprised of a display, graphics processing software, graphics processing circuitry, and an interface coupling the display and the graphics processing circuitry, comprising:

a receiving mechanism configured to receive a set of test parameters;

a graphics mechanism configured to use the set of test parameters to generate a video image of an object in motion;

a display mechanism configured to display the video image of the object in motion on the display; and a measurement mechanism configured to measure the amount of distortion in the shape of the object in motion relative to the shape of the object in a stationary state, wherein the measurement mechanism is further configured to:

place a ruler on a boundary of the object where the distortion occurs, increase a width of the ruler until the ruler covers the distortion and measure the width of the ruler to determine the size of the distortion.

20. The apparatus of claim 19, wherein the display mechanism is further configured to display a second object, and the measurement mechanism is further configured to measure the amount of distortion caused by the interaction of the second object with the object in motion.

21. The apparatus of claim 19, wherein the receiving mechanism is further configured to receive a request to change an attribute of the object in motion, and in response to the request, to change an attribute of the object in motion.

22. The apparatus of claim 21, wherein the attributes can include one of color, size, shape, shading, fill pattern, speed, direction of movement, and type of movement.

23. The apparatus of claim 19, wherein the measurement mechanism is further configured to display the ruler every $n^{th}$ refresh cycle to minimize distortion of the ruler.

24. The apparatus of claim 19, wherein the measurement mechanism is further configured to use the width of the ruler to determine response time of the pixels in the display.

25. The apparatus of claim 19, wherein the distortion can include one of:

flickering;

flashing;

smearing;

bluring;

line spreading;

geometric distorting;

color-induced artifacts; and inaccurate color reproduction.

26. The apparatus of claim 19, further comprising a storage mechanism configured to store the set of test parameters to a storage medium to facilitate producing an identical set of test parameters during a subsequent test.

27. The apparatus of claim 19, further comprising a recording mechanism configured to record the measured distortion on a storage medium.

* * * * *